United States Patent
Schatz

[19]

[11] Patent Number: 5,950,708
[45] Date of Patent: Sep. 14, 1999

[54] HEAT STORAGE IN PARTICULAR FOR AUTOMOTIVE VEHICLES COMPRISING A DOUBLE-WALL STORAGE HOUSING

[75] Inventor: Oskar Schatz, Gauting, Germany

[73] Assignee: Schatz Thermo System GmbH, Erling-Andechs, Germany

[21] Appl. No.: 08/861,103

[22] Filed: May 21, 1997

[30] Foreign Application Priority Data

May 22, 1996 [DE] Germany .......................... 196 21 032

[51] Int. Cl.[6] ................................................. F28D 17/00
[52] U.S. Cl. ........................ 165/10; 165/10 A; 165/135; 123/41.14
[58] Field of Search .......................... 165/135, 10, 10 A; 123/41.14

[56] References Cited

U.S. PATENT DOCUMENTS

| | | | |
|---|---|---|---|
| 2,003,496 | 7/1935 | Roe ............................................ | 165/10 |
| 4,026,353 | 5/1977 | Crowdy .................................... | 165/135 |
| 4,088,183 | 5/1978 | Anzai et al. ........................... | 165/10 A |
| 4,234,782 | 11/1980 | Barabas et al. ....................... | 165/10 A |
| 4,371,028 | 2/1983 | Helshoj ................................... | 165/10 A |
| 4,536,642 | 8/1985 | Hamster et al. ........................... | 165/10 |
| 4,565,242 | 1/1986 | Yano et al. ............................... | 165/10 |
| 4,932,465 | 6/1990 | Schatz .................................... | 165/10 A |
| 4,977,952 | 12/1990 | Schatz .................................... | 165/10 A |
| 5,090,474 | 2/1992 | Schatz .................................... | 165/10 A |
| 5,165,467 | 11/1992 | Schatz et al. ............................. | 165/10 |
| 5,222,298 | 6/1993 | Schatz .................................... | 165/10 A |

FOREIGN PATENT DOCUMENTS

| | | | |
|---|---|---|---|
| 0302273 B1 | 2/1989 | European Pat. Off. . | |
| 2658720 A1 | 11/1978 | Germany . | |
| 3628893 | 3/1987 | Germany ............................. | 165/10 A |
| 4007002 A1 | 9/1991 | Germany . | |

*Primary Examiner*—Ira S. Lazarus
*Assistant Examiner*—Terrell McKinnon
*Attorney, Agent, or Firm*—Harness, Dickey & Pierce, PLC

[57] ABSTRACT

A heat storage, in particular for automotive vehicles, includes a storage housing which consists of an internal casing of a not round cross-section and an external casing enclosing the former in spaced relationship and a heat insulation, in particular a not supportive high vacuum insulation, enclosed between the internal and external casings. The cross-section of the casing shell of at least the internal casing comprises circular arc segments. The casing shell is supported at the transitions between the circular arc segments and adjacent cross-sectional portions of the container shell. Supplemental or alternative to such structure of the circular arc segments the external casing shell and the internal casing shell can be rigidly connected by connection elements so as to form an insulation container havina walls of sandwich-structure.

22 Claims, 5 Drawing Sheets

HEAT STORAGE IN PARTICULAR FOR AUTOMOTIVE VEHICLES COMPRISING A DOUBLE-WALL STORAGE HOUSING

The invention relates to a heat storage in particular for automotive vehicles, comprising a storage housing which consists of an internal casing of a not-round cross section and an external casing enclosing the internal casing in spaced relationship, and a heat insulation, in particular a not supportive high-vacuum insulation, which is enclosed between the internal and external casings.

With respect to the efficiency of heat storages it is particularly important to minimize heat losses from the interior of the storage housing. There have become known storages including an internal casing receiving the storage medium and an external casing surrounding the internal casing in spaced relationship, with the area between the internal and external casings being formed as an insulation zone. It has become known to provide high vacuum in the insulation zone and to maintain it permanently. The internal casing has to withstand the pressure prevailing in its interior, for exampling a pressure of up to 5 bar when the engine cooling fluid is used as heat carrier in automotive vehicles, whereas the external casing containing the high vacuum has to withstand the ambient pressure of 1 bar.

It has become known to provide between the internal and external casings, instead of high vacuum, a microporous insulation which is better suited to withstand the internal pressure of the internal casing. The reduced insulation action and the increased space requirements as compared to a high vacuum insulation are put up with. The present invention is particularly advantageous in heat storages which are designed for optimal heat insulation at minimal space requirements and therefore use high vacuum insulation between the internal and external casings; it allows also for a particularly light and stable structure when measures are provided in the insulation zone for withstanding at least partially the internal pressure of the internal casing.

The structure of the heat storage housing has to take up safely the prevailing pressures, and deformations are to be prevented among others in view of the often limited space available for example in the engine cavity of an automotive vehicle. The structure should be made up of minimal masses for weight and cost reasons, and heat bridges between the internal and external casings should be minimized.

For taking up the prevailing pressures a container shape comprising a circular cylindrical shell closed at both ends by end caps is best suited. In the circular cylindrical shell there can occur only normal forces, i.e. tension and possibly compression forces which can be handled most easily from a technical point of view. Normal forces, in particular tension forces, are advantangeous in that the tension forces are uniformly distributed about the cross-sectional area and accordingly allow for optimal use of the material. Furthermore, tension forces result in dimensional stability. Buckling as a result of compression forces is not possible; similarly bulging due to bending forces is prevented thereby.

When space is limited as for example in the engine cavity of an automotive vehicle, this optimum container shape cannot always be used; rather containers of a cross-sectional shape different from the circular shape, for examples containers of approximately rectangular cross-section, must be used. Such containers have side walls which are generally planar or at least substantially different from a circular cross-sectional shape. Such cross-sectional shape results in the occurence of bending forces and a tendency of the containers to be deformed under load, in particular to bulging. Deformations of the containers are highly undesired for various reasons which will be explained later. For taking up the bending forces the container walls have to be provided with additional stiffening means which take up valuable space; furthermore these measures result in increased container weight.

It is an object of the invention to design heat storages, in particular for automotive vehicles, of the above-identified type such that the container will be of minimal material, weight and volume requirements, will result in minimal heat losses, will be cost-effective, substantially free of deformations even though cross-sectional shapes other than the circular shape will be used.

The solution is characterized in that the cross-section of the casing shell of at least the internal casing comprises circular arc segments and that said casing shell is supported at the transitions between said circular arc segments and adjacent cross-sectional portions of said casing shell, with the circular arc segments being arcuate convex towards the container outside. Furthermore, it is advantageous for the circular arc segments of the container shell cross-sections to be of the same radius of curvature.

In the circular arc-shaped segments only normal forces, i.e. tension or compression forces, may occur. As a result the same conditions as to container rigidity and dimensional stability prevail in the area of these segments as in containers of circular cross-section. Further forces acting at the transitions between adjacent segments and not occuring in containers of circular cross-section are being taken up by the supports provided thereat. As far as in this specification and the claims the term "support" is being used, this means a measure for taking up compression or tension forces, depending on the type of load, which is suited to counteract any change of position of the supported area.

What kind of forces occur at the transitions between the circular arc segments depends on the one hand on the cross-section as shape of the container and on the other hand on whether the container is subjected to internal or external pressure. If, for example, a rectangular shape is approximated by each side of the rectangle being formed by an outwardly convex arcuate circular arc segment, forces directed towards the interior of the container are to be taken up at the transitions. For taking up these forces, it is sufficient to have the casing shell engage a support within the interior of the casing at the transitions. When, however, a very long side of the rectangle is made up of a plurality of such circular arc segments, outwardly directed forces occur at the transitions between these segments, which forces can be taken up within the casing by tie rods which require a tension force withstanding connection to the casing shell.

In particular in cases where the internal casing of the heat storage is designed such that the support has to withstand only compression forces, an advantageous embodiment provides that the transitions are transition arcs. According to a further advantageous development of the invention a support member, preferably a hollow profiled member, engaging the casing shell at least at the transitions is disposed within the casing shell.

According to a further advantageous development of the invention a portion of an extruded profiled member adapted to the cross-section of the internal casing is disposed within the internal container as a support member for supporting the transitions. This allows for a very cost-effective production of the support.

Depending on the type of storage, the internal container is provided with various structures, for example flow conducting means for the heat carrier flowing into and from the storage or partitions to provide flow passages and chambers or retaining means for the storage medium to be converted in latent heat storages. According to a further advantageous embodiment further cost reduction may be achieved by supporting the transitions by the internal structure of the internal casing which is provided for storage purposes. This allows not only to avoid additional material expenditure, but allows also to reduce the number of parts to be mounted.

According to a first variant it is possible that said internal structure of the internal casing comprises an inserted portion of an extruded profiled member, which is adapted to its cross-section and is arranged to support the transitions. However, it is particularly advantageous to provide that the shell of the internal casing along with the internal structure of the internal casing forms a portion of an integral extruded profiled member so that only a pair of end caps are to be mounted and the conduits for the heat carrier are to be connected thereto for completing the internal casing. In this case the portion of the extruded profiled member which forms the internal structure can take up both compression and tension forces.

The extruded profiled members can be made from plastic material or light metal, in particular aluminium.

When heat storages are operated with heat carrier exchange, i.e. when the heat carrier mass within the storage is replaced, if necessary, by a heat carrier mass of a different temperature level, the internal casing preferably contains flow conductive means which provide the interior of the casing between the inlet and outlet ports with a relatively long flow passage of correspondingly reduced cross-section in order to substantially prevent the mixing of the inflowing heat carrier and the outflowing heat carrier. These flow conducting passages must be sealed with respect to the internal walls of the casing in order to prevent short circuit flow outside of transitional flow areas. Accordingly, a further advantageous embodiment provides, in the case of an extruded profiled member inserted into the internal casing and serving as a flow conducting means, that the extruded profiled member sealingly engages the internal walls of the casing. Such a structure can be reliably realized only—as ensured by the invention—when contact between the extruded profiled member and the portion of the casing walls which enclose the extruded profiled member cannot be interrupted by deformations of the casing cross-section.

A particularly simple structure of an internal casing of the type as described above is characterized in that an extruded profiled member provided with a plurality of parallel longitudinal passages has associated therewith baffle caps adapted to be connected to its end faces and provided with baffle and/or transition flow passages adapted to communicate said longitudinal passages so as to provide a continuous flow passage, said internal structure which consists of the extruded profiled member and said pair of baffle caps being inserted into an internal casing shell which is closed at its opposite ends by end caps sealingly connected to the internal casing shell.

As an alternative flow guide walls are inserted into the extruded profiled member for providing said longitudinal passages.

In a further advantageous embodiment the internal casing shell together with the end caps closing it are made of special steel.

In a heat storage wherein wherein the tansions contacting the circular arc segments at their transitions at the casing outside include an angle of more than 180°, the casing shell is supported at the transitions so as to withstand compression forces If this angle is less than 180°, the transitions are supported by tie rods.

An advantageous development comprises that partitions dividing the internal space of the internal casing into flow passages are integrally formed with the extruded profiled member; preferably that partitions dividing the internal space of the internal casing into flow passages are integrally formed with the extruded profiled member.

The extruded profiled member and, if desired, the baffle caps and, respectively, end caps can be made of light metal, preferably aluminium, or of plastic material —insofar as they are inserted into the internal casing.

The use of light metal molded parts may cause problems in maintaining the vacuum in an evacuated insulation zone, which problems result from a not-sufficient material density; therefore it is advantageous to compress the light metal molded parts limiting the insulation zone by forging after the molding step.

The proposal of the invention to make up the casing shell of circular arc segments encounters difficulties when the insulation container must be of a particularly flat shape because in this case a plurality of short circular arc segments each being supported against the internal casing by tie rods will be necessary in order to prevent substantial bucklings. In order to overcome this difficulty another advantageous solution is characterized in that, in a heat storage of the above-identified type and as an alternative of the above described solution, the shell of the insulating container is of sandwich-construction such that the external casing and the internal casing are connected by supportive connection elements of small cross-section and minimal heat conductivity with respect to its supporting capabilities so as to form a rigid deflection resistent unit. However, it would also be possible to combine this solution with the first mentioned solution. The connection elements can be rigidly connected to the internal and/or external casing. Preferably, the heat conductivity of the connection elements equals or exeeds 1 W/mK.

Preferably, the connecting elements are made of special steel. The connection of the external casing, the internal casing and the connecting elements is provided preferably by adhesive or thermal action to obtain a bending force resistent insulation container.

The invention will be explained in more detail with reference to the following description of the embodiments shown in the drawings In the drawings.

Figure 8:
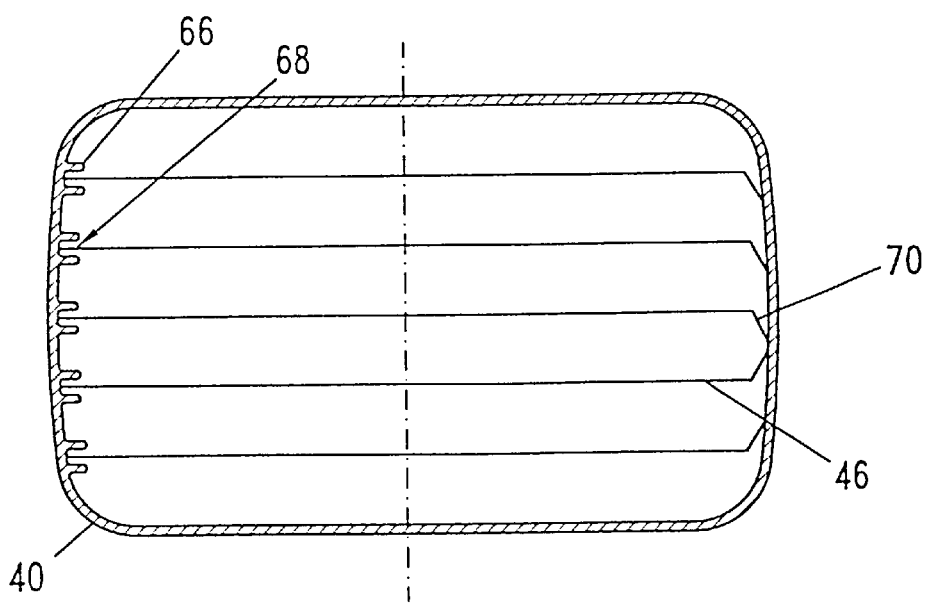
Figure 9:
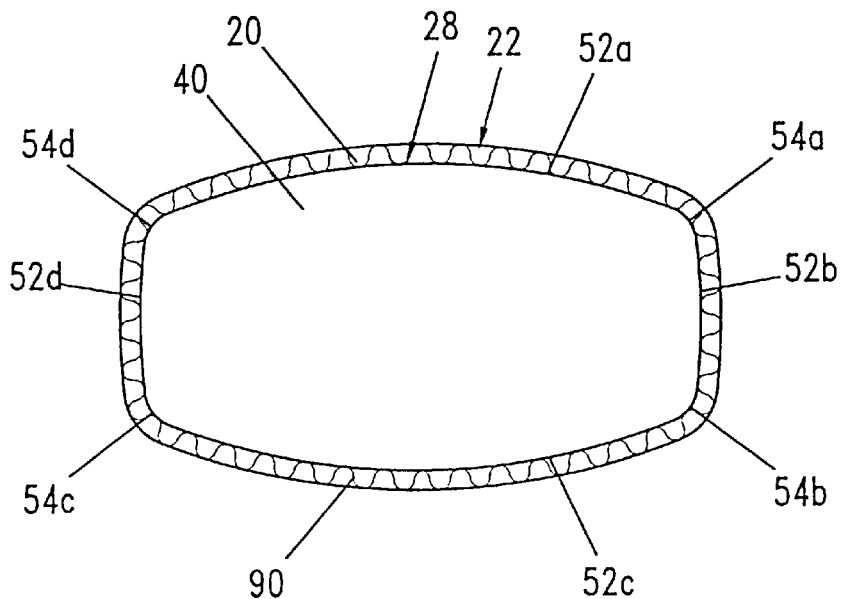
Figure 10:
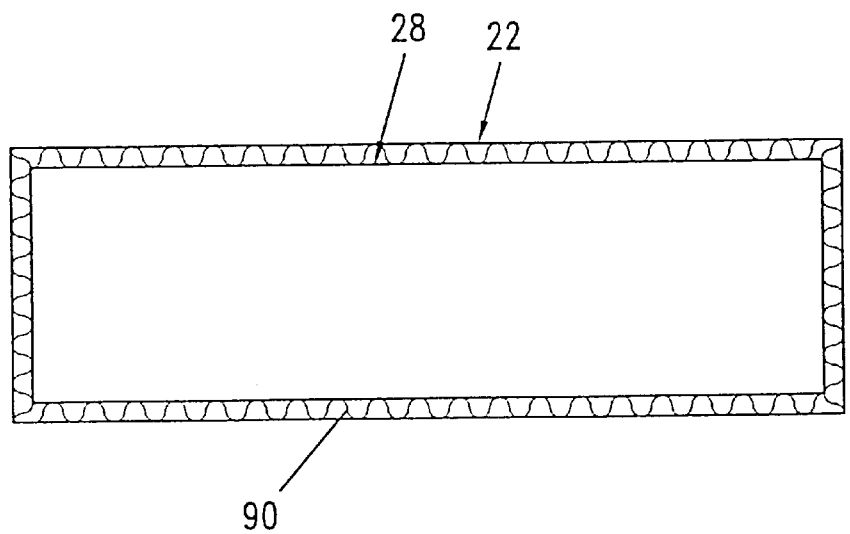

FIG. 8 two versions of the flow conductive assembly within the internal casing;

FIG. 9 a section of a first embodiment of an insulation container in sandwich-construction; and FIG. 10 another embodiment in sandwich-construction.

Figure 1:
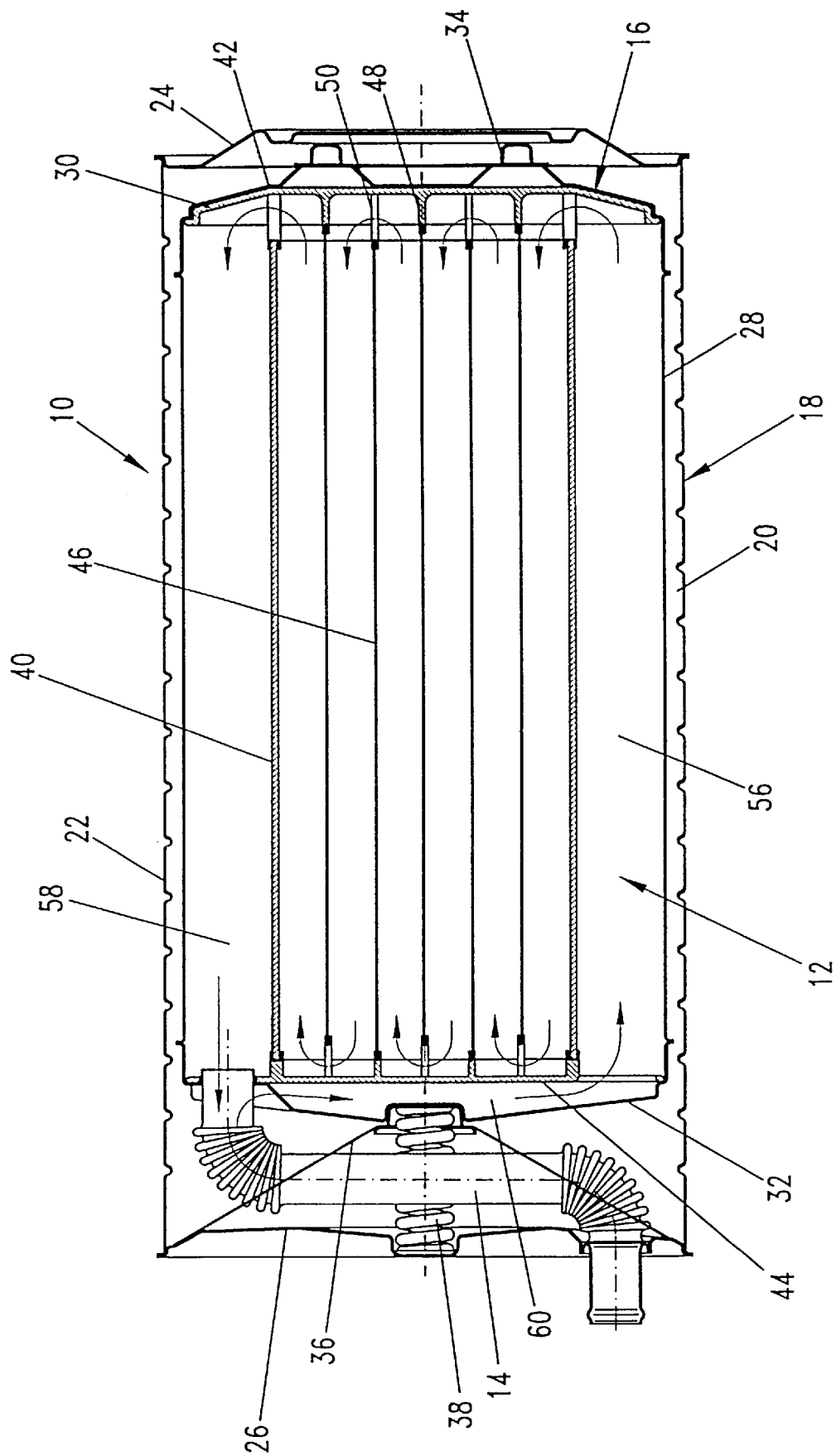
FIG. 1 is a schematic longitudinal section of a first embodiment of a heat storage of the invention.

FIG. 1 shows a heat storage designated by 10, which heat storage is of double-walled structure and is adapted to receive the storing heat carrier in an internal casing 12. To this end, the internal casing communicates with a pair of conduits 14, i.e. an inlet conduit and an outlet conduit. These conduits are positioned behind each other in the viewing direction of FIG. 1 so that in FIG. 1 only the outlet conduit can be seen while the inlet conduit is hidden thereby. For clarity reasons, the flow direction of the heat carrier during loading and unloading of the heat storage 10 is indicated by arrows, with the arrows indicating both the inflow direction and the outflow direction in the area of the connections of conduits 14 to the internal casing 12.

In order to minimize mixing of the inflowing heat carrier and the outflowing carrier displaced thereby and heat losses caused by the temperature difference between inflow and outflow a relatively long flow passage of correspondingly small flow cross-sectional area is provided therein by an internal structure 16 of the internal casing 12 such that the hot and cold heat carrier masses contact each other only in the area of this small cross-sectional area so as to substantially restrict heat losses.

In order to prevent heat losses via the walls of the internal casing, the internal casing is positioned internally of an external casing 18 in spaced relationship thereto such that there is an insulation zone 20 between the two casings 12 and 18; in the insulation zone there is a vacuum, preferably a high vacuum, and insulation material which, if desired, may perform a supporting function between the internal and external casings can be positioned therein.

The external casing 18 consists of a casing shell 22 and a pair of end caps 24 and 26. Similarly, the internal casing 12 comprises a casing shell 28 and a pair of end caps 30 and 32.

In order to substantially avoid heat bridges, the internal casing 12 can be precisely positioned in the external casing 18 via connection means of a relatively small cross-sectional area, for example via support elements 34 between the end caps 24, 30 and a filigree suspension 36 between the end caps 26 and 32, with a compression spring 38 acting upon the internal casing 12 towards the end cap 24.

The internal structure 16 of the internal casing 12 comprises, in the embodiment shown in FIG. 1, and extruded profiled member serving as a support member 40, a pair of baffle caps 42 and 44 adjacent the end caps 30 and 32, respectively, being connected to the two faces of the extruded profiled member. The support member 40 contains a plurality of spaced and parallel flow conducting walls 46 having associated therewith at the baffle caps 42 and 44 support fins such that one end of each slow conducting wall 46 engages or is otherwise sealingly connected to a continuous support fin 48 which is a flow conducting extension of the respective flow conducting wall, while the other end of the flow conducting wall 46 is positioned by a support fin 50 which has a cut-out for flow communication from one side of the flow conducting wall to the other side thereof as indicated by arrows in FIG. 1. At the baffle caps 42 and 44 support fins 48 and support fins 50 alternate with each other such that when the heat carrier within the storage is being replaced the heat carrier flows along both sides of a flow conducting wall 46 in following portions of a single long flow passage in opposite directions.

Figure 2:
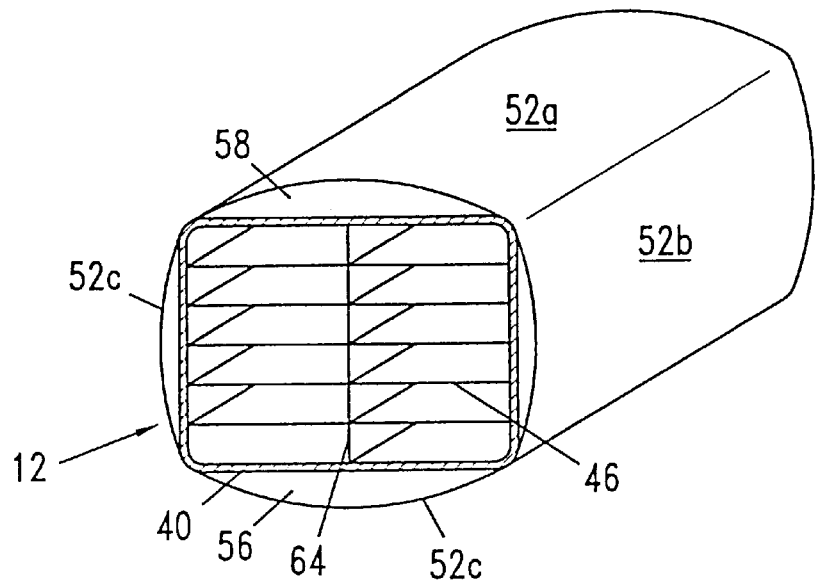
FIG. 2 is a perspective schematic cross-section of a heat storage of the type shown in FIG. 1.

As may be seen for example in FIGS. 2 to 7, the internal casing 12 is of a not round cross-sectional shape depending on the cross-sectional shape of the external casing 18 adapted to the space conditions at the location of assembly; corresponding to such cross-sectional shape the casing shell 28 is defined at least partially by circular arc segments, in FIG. 2 for example by the circular arc segments 52a, 52b, 52c, and 52d. At the transitions 54a, 54b, 54c, and 54d between these circular arc segments the casing shell 28 sealingly engages the support member 40 and is supported thereby. As a result there are passages 56 and 58 extending parallel to the flow conducting walls 46 between the casing shell 28 and the support member 40 in FIG. 1, which passages 56 and 58 communicate in the area of the baffle cap 52 via discontinuous support fins 50 with the respective adjacent passage within the support member 46. In the area of the opposite baffle cap 54 the conduit 14 serving as outlet conduit extends into the upper passage 56. The inlet conduit which cannot be seen terminates in a chamber 60 provided between the end cap 32 of the internal casing 12 and the baffle cap 44. The baffle cap 44 is provided with a cut-out 62 for communicating the chamber 60 with the lower passage 56.

FIG. 2 shows a schematic cross-section of the support member 40 in the internal casing 12, with the flow conducting walls 46 separating the flow passages from each other and a stiffening wall 64 extending across the support member 40 centrally and normally with respect to the flow conducting walls 46 being shown rather schematically without any further details.

In practice there are various possible embodiments of such a structure. The support member 40, together with the wall 64, if desired, can be formed as an extrided profiled member, preferably of light metal. Slotted fins 66 extending in the direction of extrusion can be integral with the internal surfaces of the support member 40 and, if desired, with the wall 64 for supporting the flow conducting walls 46 and for sealing the flow passages from each other, as may be seen in the left half of FIG. 8. The flow conducting walls 46 are being inserted into the slots 68 of the fins 66 for assembly thereof. As an alternative the flow conducting walls 46 can be provided with resilient edges 70 at the longitudinal edges extending in flow direction, which resilient edges sealingly engage the support member 40, with the support member 40 being provided with profiles for positioning the flow conducting walls 46.

A further alternative is to make the flow conducting walls 46 integral with the support member 40 as a part of the extruded profiled member.

Figure 3:
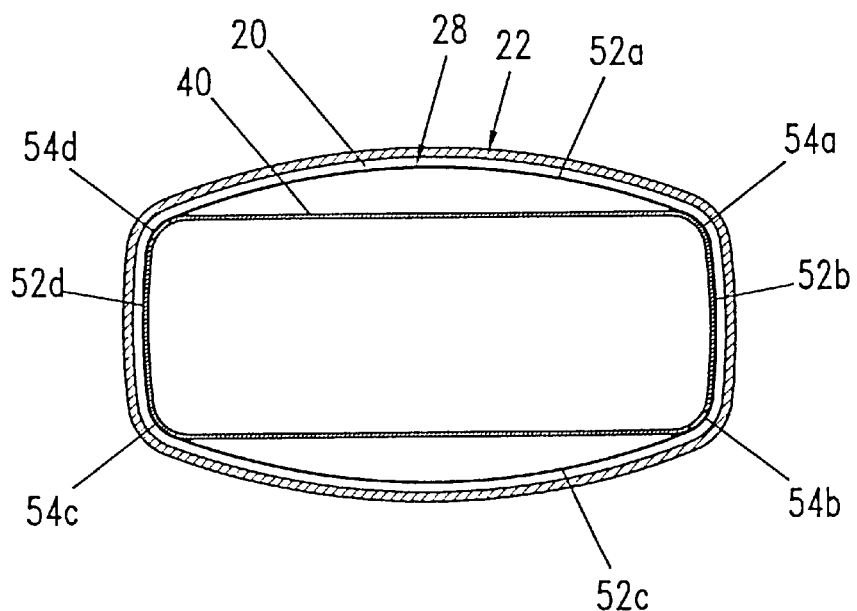
FIG. 3 is a schematic cross-section of a first variant of the heat storage without showing the internal structure of the internal casing.

FIG. 3 shows a cross-section of a heat storage 10 comprising an external casing 18, an internal casing 12, and a support member 40, with the complete internal structure 16 not being shown for simplicity reasons. In this drawing it may be seen that the shell 22 of the external casing 18 and the shell 28 of the internal casing, in cross-section, are spaced from each other by the same distance and that only a small spacing between the shell 22 of the external casing 18 and the shell 28 of the internal casing 12 is required for heat insulation of the internal casing 12 when there is a high vacuum in the insulation zone 20; this is very advantageous in the case of limited available space. Furthermore it may be clearly seen that no deformations of the closely adjacent casing shells 22 and 28 can be permitted in order to maintain the heat insulation.

In this FIG. 3 the radii of curvature of the four circular arc segments 52a–52d are of the same value, and it has been clearly shown that the transitions 54a–54d between the circular arc segments are formed as transition arcs. When the heat storage is of the shown cross-sectional shape of a flat rectangle with a substantial difference in length between the long and short parallel sides, a relatively large radius of curvature of the circular arc segments 52a and 52c associated with the long sides is favorable because it enhences the flat cross-sectional shape on the one hand and the spacing between the support member 40 and the inner side of the circular arc segments 52a and 52c, respectively, is sufficient to provide for the required cross-sectional area of the passages 56 and 58. Therefore, it is preferred to have the flow conducting walls 46 not shown in FIG. 3 extend parallel to the support member surfaces facing the long cross-sectional sides 52a and 52c. At the short sides, a comparable cross-sectional area is not required; this is why the shell 28 of the internal casing 12 along with the circular arc segments 52b and 52d rests upon side surfaces of the support member 40 adapted to the curvature thereof.

Figure 4:
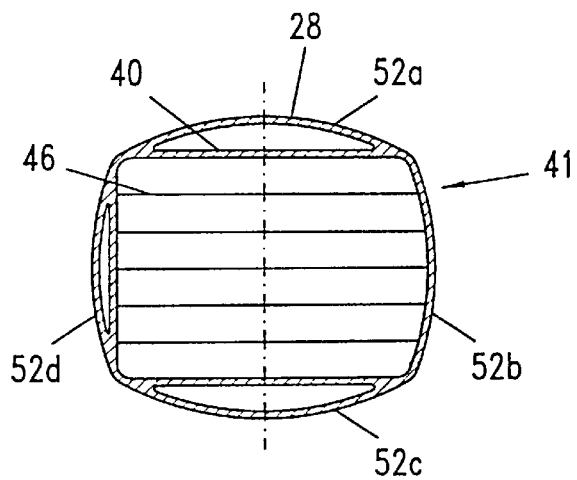
FIG. 4 is a schematic cross-section of another variant of the heat storage similar to FIG. 3.

FIG. 4 shows a variant wherein the shell 28 of the internal casing 12 together with the support member 40 are made as an integral extruded profiled member 41. Since also in this structure the transitions between the circular arg segments 52a–52d are supported by the support member 40, the advantageous effect is being maintained.

Preferably, all circular arc segments 52–52d forming a casing shell 28 are of the same radius of curvature. When the casing side surfaces are of relatively small width this may result in that the spacing between the casing shell 28 and the support member 40 will be so small that—as shown in the right half of FIG. 4—it will be possible without any significant drawback to combine the adjacent surfaces of the casing shell 28 and the support member 40 into a single enforces profiled portion.

Figure 5:
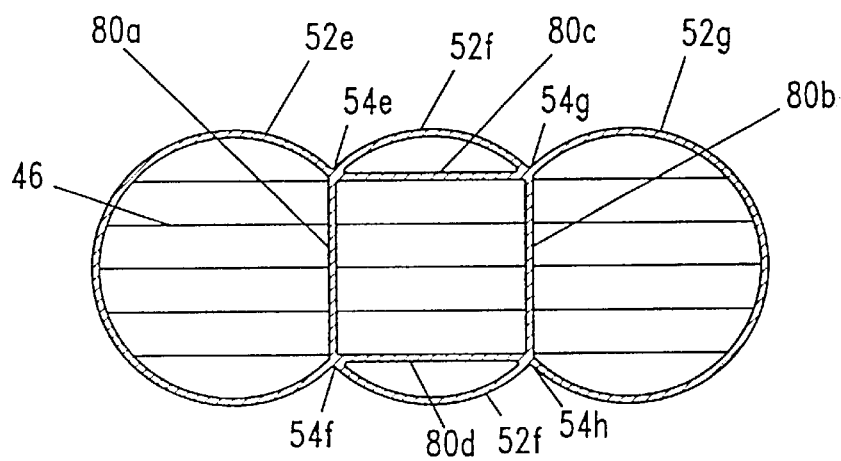
FIG. 5 is a schematic cross-section similar to FIG. 3 of an alternative structure of a heat storage of the invention.
Figure 6:
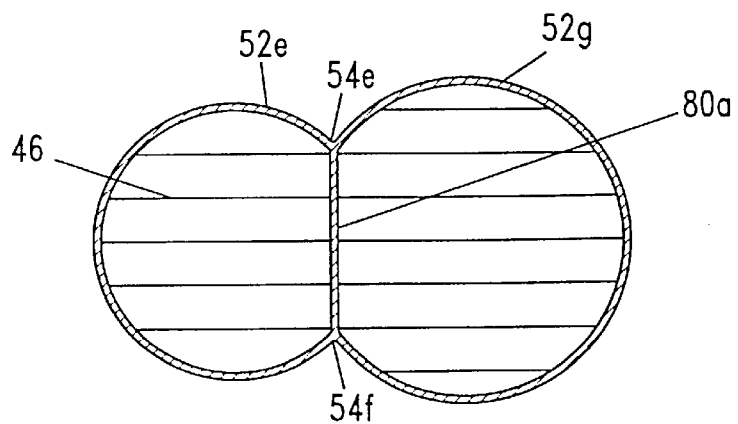
FIG. 6 is a schematic cross-section similar to FIG. 5 of another variant of the heat storage.

When, however, a relatively great width of a cross-sectional portion results in such a height of the circular segment bridging such width that the available space is not sufficient, this width can be bridged by two or more circular segments 52e, 52f, 152g as shown in FIGS. 5 and 6. The circular segments 52e and 52g forming the narrow side of the casing shell 28 extend into the wide side of the casing shell 28, with the remaining spacing being closed by an inserted circular segment 52f or 52f' of same radius of curvature—as shown in FIG. 5—or, if desired, by a plurality of such circular segments.

While with the cross-sectional shapes shown in FIGS. 2 to 4 compression forces are to be taken up by the support member at the transitions between the circular segments 52a to 52d, tension forces occur at the transitions 54, 54f, 54g and 54h between the circular segments 52e to 52g in FIGS. 5 and 6, which tension forces are being taken up by tie rods 80a, 80b, 80c and 80d which therefore are connected to the circular segments 52e—52g and, respectively, the casing shell 28 in a manner suitable for transferring tension forces, preferably however, are integral with the support member as part of an extruded profiled member.

Figure 7:
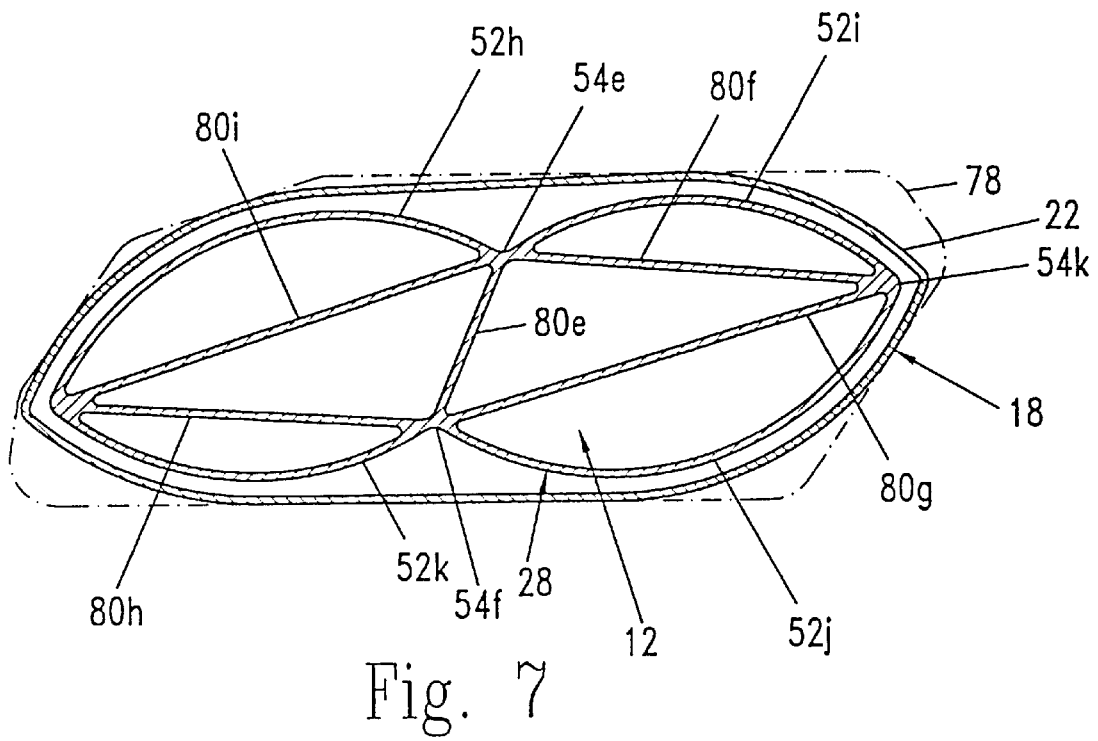
FIG. 7 is a further schematic cross-section of a heat storage of the invention suited for a limited space.

In the embodiment of FIG. 7 a dash-dotted line 78 represents the outline of the cross-sectional area available for mounting the heat storage, which cross-sectional area is adapted to the shell 22 of the external casing 18. The shell 28 of the internal casing 12 is composed, in a manner adapted to the predetermined cross-section, of circular arc segments 52h, 52i, 52j and 52k with the tension forces occuring in this embodiment at the transitions 54i and 54f being taken up by a tie rod 80i. The inwardly directed compression forces occuring at the transitions 54j and 54k are being taken up by compression rods 80f, 80g, 80h and 80i disposed like a three pivot frame above the tie rod 80e as a common basis.

FIG. 9 shows, similar to FIG. 3, a cross-section of an insulation container of a heat storage, with corresponding parts being designated by reference numerals already used in FIG. 3. The casing shell of the external casing has been designated by 22, and the casing shell of the internal casing has been designated by 28. In contrast to the structure of FIG. 3 thin-walled connection elements 90 of wave-shaped cross-section extend through the insulation zone 20 between two casing shells 22 and 28, these connection elements being rigidly connected to the external casing shell 22 and the internal casing shell 28 in the area of the apexes. The connection elements 90 are made of a material of low heat conductivity such as special steel or plastic material so that heat losses in the area of the insulation zone can be minimized. The connection between the connection elements 90 and the external casing shell 22 and, respectively, the internal casing shell 28 can be realized, depending on the materials used, for example by adhesive, welding or soldering so that these parts connected to each other form a bending resistent structure, and supports in the interior of the casing shell 28 of the internal casing are no longer necessary.

The use of such sandwich-construction is particularly advantageous when an extremely flat heat storage is required due to limited space and the arcuate shape of the casing shell would be a drawback so that, for reducing the arcuate shape, a plurality of elements of circular segment shape would have to be positioned adjacent to each other, which would result in a corresponding number of internal supports. FIG. 10 shows an example of an insulation container suitable for extreme flat constructions and not requiring any boldges because the used sandwich-construction including connection elements 90 between the external casing shell 22 and the internal casing shell 28 can be made sufficiently bending force resistent in order to withstand in particular the casing internal pressure without any deformation of the heat storage.

I claim:

1. A heat storage (10) for automotive vehicles comprising a storage housing having an internal casing adapter for having a fluid flowing within said internal casing said internal casing (12) being of a not-round cross section, an external casing (18) enclosing the internal casing in spaced relationship, and a heat insulation (20) which is enclosed between the internal and external casings, wherein, the cross-section of a casing shell (28) of at least the internal casing (12) comprises circular arc segments (52a–52d; 52e–52g; 52e,52g; 52h–52k) and that said casing shell is supported at transitions (54a–54d; 54e–54h; 54e,54f; 54e, 54f,54j,54k) between said circular arc segments and adjacent cross-sectional portions of said casing shell (28).

2. A heat storage according to claim 1 wherein, the circular arc segments (52–52d; 52e–52g; 52e,52f; 54e,54f, 54j,54k) are arcuate convex towards the casing outside.

3. A heat storage according to claim 1 wherein, the circular arc segments (52a–52d; 52e–52g; 54e,54f,54j,54k) of the casing shell cross-section are of the same radius of curvature.

4. A heat storage according to claim 1 wherein, said transitions (54a–54d) are formed as transition arcs.

5. A heat storage according to claim 1 further comprising a support member (40) engaging the casing shell (28) at least at the transitions (54a–54d) positioned within the casing shell (28).

6. A heat storage according to claim 5, wherein, the support member (40) is a hollow profiled member.

7. A heat storage according to claim 1 further comprising a portion of an extruded profiled member adapted to the cross-section of the internal casing (12) is disposed within the internal casing (12) as a support member for supporting the transitions (54a–54d).

8. A heat storage according to claim 1 further comprising an internal structure (16) of the internal casing serving storing purposes, wherein, the transitions (54a–54d) are supported by said internal structure (16).

9. A heat storage vehicles, according to claim 8 wherein, said internal structure (16) of the internal casing (12) comprises an inserted portion (40) of an extruded profiled member, which is adapted to its cross-section and is arranged to support the transitions (54a–54b).

10. A heat storage according to claim 8 wherein, the shell (28) of the internal casing (12) together with the internal structure (16) of the internal casing forms a portion (41) of an integral extruded profiled member and that the internal casing is adapted to be closed by a pair of end caps (30,32) to be connected to the shell.

11. A heat storage according to claim 9, including an extruded profiled member inserted into the internal casing (12) and arranged to serve as flow guide means, wherein, the extruded profiled member (40) sealingly engages the internal walls of the internal casing.

12. A heat storage according to claim 10 wherein, said extruded profiled member (40) provided with a plurality of parallel longitudinal passages has associated therewith baffle caps (42,44) adapted to be connected to its end faces and provided with baffle and/or transition flow passages adapted to communicate said longitudinal passages so as to provide a continuous flow passage, said internal structure (16) which consists of the extruded profiled member (40) and said baffle caps (42,44) being inserted into an internal casing shell (28) which is closed at its opposite ends by end caps (30,32) sealingly connected to the internal casing shell (28).

13. A heat storage according to claim 12 wherein, flow guide walls (46) are inserted into the extruded profiled member for providing said longitudinal passages.

14. A heat storage according to claim 13 wherein, the extruded profiled member is provided with longitudinally slotted fins (66) extending along its internal surface in the direction of extrusion, and that said flow guiding walls (46) are inserted into the slots (68) of said fins.

15. A heat storage according to claim 13 wherein, said flow guiding walls (46) have their longitudinal edges (70) extending in flow direction resiliently engage the internal surface of the extruded profiled member for sealing purposes.

16. A heat storage according to claim 1 wherein, said internal casing shell (28) and a pair of end caps (30,32) closing it are made of special steel.

17. A heat storage according to claim 1 wherein, the tangents contacting the circular arc segments (52a–52d) at their transitions (54a–54d) at the casing outside include an angle of more than 1800°, wherein, the casing shell (28) is supported at the transitions (54a–54d; 54j,54k) so as to withstand compression forces.

18. A heat storage according to claim 1 wherein, the tangents contacting the circular arc segments (52a–52d; 52e,52f,52f,52g; 52e,52g; 52h, 52i,52j,52k) merging at the transitions (54a–54d; 54e,54f,54g,54h; 54e,54f) on the casing outside include an angle of less than 180° wherein, the transitions (54e–54g; 54e,54f) are supported by tie rods (80a–80d; 80e).

19. A heat storage according to claim 18 wherein, the casing shell (28) together with the compression members or, respectively, tie rods associated with the transitions are formed as an extruded profiled member.

20. A heat storage according to claim 19 wherein, partitions (46) dividing the internal space of the internal casing (12) into flow passages are integrally formed with the extruded profiled member.

21. A heat storage according to claim 12 wherein, the extruded profiled member (40) and the baffle caps (42,44) associated therewith are made of plastic material.

22. A heat storage according to claim 12 wherein, the extruded profiled member (40,41) and the end caps associated therewith are made of light metal.

* * * * *

UNITED STATES PATENT AND TRADEMARK OFFICE
CERTIFICATE OF CORRECTION

PATENT NO. : 5,950,708
DATED : September 14, 1999
INVENTOR(S) : Oskar Schatz

It is certified that error appears in the above-identified patent and that said Letters Patent is hereby corrected as shown below:

Title page, [57] Abstract, line 15, "havina" should be --having--

Col. 1, line 22, delete "exampling" and substitute --example-- therefor

Col. 3, line 62, delete second occurrence of "wherein"

Col. 3, line 66, after "forces" insert a period

Col. 4, line 44, after "drawings" insert a period

Col. 5, line 44, delete "and" and substitute --an-- therefor

Col. 6, line 29, "extrided" should be --extruded--

Col. 7, line 3, delete "enhences" and substitute --enhances-- therefor

Col. 7, line 19, delete "arg" and substitute --arc-- therefor

Col. 7, line 22, delete "52-52d" and substitute --52a-52d-- therefor

Col. 7, line 30, delete "enforces" and substitute --enforced-- therefor

Col. 7, line 35, delete "152g" and substitute --52g-- therefor

Col. 7, line 39, "52f'of" should be --52f' of--

Col. 8, line 27, delete "boldges" and substitute --bulges-- therefor

UNITED STATES PATENT AND TRADEMARK OFFICE
CERTIFICATE OF CORRECTION

PATENT NO. : 5,950,708

DATED : September 14, 1999

INVENTOR(S) : Oskar Schatz

It is certified that error appears in the above-identified patent and that said Letters Patent is hereby corrected as shown below:

Col. 8, line 49, claim 2, delete "(52-52d" and substitute --(52a-52d-- therefor

Col. 9, line 5, claim 9, delete "vehicles,"

Col. 10, line 12, claim 17, "1800°" should be --180°"

Col. 10, line 17, claim 18, second occurrence of "52f" should be --52f'--

Signed and Sealed this

Fourth Day of July, 2000

Q. TODD DICKINSON

Attest:

Attesting Officer

Director of Patents and Trademarks